(12) United States Patent
Adachi

(10) Patent No.: US 7,577,342 B2
(45) Date of Patent: Aug. 18, 2009

(54) TV SYSTEM INCLUDING OPTICAL DISC APPARATUS

(75) Inventor: Takafumi Adachi, Osaka (JP)

(73) Assignee: Funai Electric Co., Ltd. (JP)

( * ) Notice: Subject to any disclaimer, the term of this patent is extended or adjusted under 35 U.S.C. 154(b) by 687 days.

(21) Appl. No.: 10/934,404

(22) Filed: Sep. 7, 2004

(65) Prior Publication Data
US 2005/0053366 A1    Mar. 10, 2005

(30) Foreign Application Priority Data
Sep. 9, 2003    (JP) ............................ 2003-316425

(51) Int. Cl.
*H04N 5/00* (2006.01)
(52) U.S. Cl. ...................................... 386/126
(58) Field of Classification Search .................. 386/46, 386/9–99, 124–126, 106, 111, 113; 348/14.04, 348/687
See application file for complete search history.

(56) References Cited

U.S. PATENT DOCUMENTS

| | | | |
|---|---|---|---|
| 6,008,842 A | 12/1999 | Nagata | 348/173 |
| 6,363,440 B1* | 3/2002 | Stepp et al. | 710/52 |
| 6,392,695 B1 | 5/2002 | Watamoto et al. | 348/173 |
| 7,209,649 B2 | 4/2007 | Kobayashi | 386/125 |
| 7,224,888 B2* | 5/2007 | Kikuchi et al. | 386/95 |
| 2003/0071769 A1* | 4/2003 | Sullivan et al. | 345/63 |

FOREIGN PATENT DOCUMENTS

| | | | |
|---|---|---|---|
| EP | 1286540 | * | 2/2003 |
| JP | 04-286275 | | 10/1992 |
| JP | 05-150729 | | 6/1993 |
| JP | 08-009311 | | 12/1996 |
| JP | 08-322017 | | 12/1996 |
| JP | 09-247628 | | 9/1997 |
| JP | 09-266555 | | 10/1997 |
| JP | 09-327031 | | 12/1997 |
| JP | 2002-112124 | | 12/2002 |
| JP | 2003-032571 | * | 1/2003 |
| JP | U3093885 | | 2/2003 |

* cited by examiner

*Primary Examiner*—Thai Tran
*Assistant Examiner*—Mishawn Dunn
(74) *Attorney, Agent, or Firm*—Bacon & Thomas, PLLC

(57) ABSTRACT

A TV system including an optical disc apparatus capable of preventing a burn-in from appearing on the screen of a display is provided, wherein a timer is started to transmit still image data from the optical disc apparatus to a TV image receiver. When a predetermined time elapsed after a still image is displayed, a CPU in the optical disc apparatus sends information of the elapsed time to a CPU in the TV image receiver. Then, the latter CPU saves the current brightness value stored in a memory and supplies a brightness value smaller than the current brightness value to a drive unit for the display, thereby enabling the image intensity to be reduced on the display and/or an OSD image to be eliminated in the still image. The image intensity on the display can be returned to the initial intensity and/or the eliminated OSD image can be recovered by pushing appropriate selection keys in an operation section.

35 Claims, 4 Drawing Sheets

TV SYSTEM INCLUDING OPTICAL DISC APPARATUS

BACKGROUND OF THE INVENTION

1. Field of the Invention

The present invention relates to a TV system including an optical disc apparatus. More specifically, the present invention relates to a TV system into which both a TV image receiver used as a conventional TV set and an optical disc apparatus for playing back and/or for recording video and audio data in an optical disc, such as a DVD, CD or the like, as a recording medium, are combined.

2. Description of the Related Art

In such an optical disc apparatus as DVD player/recorder or the like, it is widely known that, when a still image such as an on-screen display (hereinafter referred to as OSD) image, which includes a message for TV viewers, is displayed for many hours on a CRT (cathode ray tube) in a TV image receiver, a burn-in takes place on the screen of the CRT, and therefore, when such a still image is displayed for hours greater than a predetermined time, it is necessary that a screen saver is used to display an animation image on the CRT. It is also well known that the brightness or luminance of an image on the CRT in the TV image receiver is adjustable over a wide range (see, for example, Japanese Unexamined Patent Application Publication No. H08(1996)-9311).

In conjunction with the above, Japanese Unexamined Patent Application Publication No. 2002-112124 has disclosed that either the playback from a DVD is stopped, or the power supply for the system is turned off and transferred into the OFF mode, when a predetermined time passes after displaying a still image, such as a disc menu, in order to prevent a burn-in from appearing on the screen of a CRT, when the still image in the DVD is displayed for many hours.

However, there is a problem that the storage capacity of a memory therefore is greatly increased in order to store data of the animation images for the screen saver in the conventional TV system, as described in Japanese Unexamined Patent Application Publication No. H08(1996)-9311. In Japanese Unexamined Patent Application Publication No. 2002-112124, furthermore, there is a problem that the disc menu cannot properly be watched, either because the playback from a DVD is stopped, or because the power supply for the system is turned off and transferred into the OFF mode.

SUMMARY OF THE INVENTION

The present invention is intended to solve the above-described problems in the prior art. Accordingly, it is an object of the present invention to provide a TV system including an optical disc apparatus, which TV system is capable of preventing a burn-in from appearing on the screen of a CRT in a TV image receiver without any increase in the storage capacity of a memory for video and audio data, when still image data are supplied from the optical disc apparatus (or the playback apparatus) to the TV image receiver.

It is another object of the present invention to provide a TV system including an optical disc apparatus, wherein TV viewers are able to clearly identify the still image on the screen of a display unit, even if any measures to suppress a burn-in on the screen are employed therein.

In a first aspect of the invention, the above objects are attained by a TV system including an optical disc apparatus comprising: a TV image receiver for displaying an image and for outputting sound from a video signal and audio signal of a TV signal; and an optical disc apparatus for playing back data in an optical disc and for supplying the signal thus played back to the TV image receiver, wherein the TV image receiver comprising: a TV signal selector for selectively accepting either a broadcast signal received by an antenna via a tuner or the playback signal from the optical disc apparatus and for outputting the signal thus selected as a TV signal; a video signal processing unit connected to the TV signal selector for dividing the TV signal into an audio signal and signals relating to the video image; an audio signal outputting unit connected to the video signal processing unit via an audio signal amplifier; a video signal outputting unit connected to the video signal processing unit via a video signal amplifier; and a TV controller for controlling the TV signal selector, the video signal processing unit, the audio signal amplifier and the video signal amplifier, wherein the optical disc apparatus comprising: a playback unit for reading data in the optical disc to output a playback signal; a playback signal processing unit connected to the playback unit for processing the playback signal to output it as a play-backed TV signal; an optical disc apparatus controller for controlling the playback unit and the playback signal processing unit; an optical disc apparatus memory allocated to the optical disc apparatus controller for storing still image data; and a signal superimposing unit for superimposing the signal of the still image data on the played-back TV signal to supply a composite TV signal to the TV image receiver, whereby when the time elapsed after a still image is displayed on the video signal outputting unit becomes greater than a predetermined time, the optical disc apparatus controller supplies an instruction of adjusting the brightness to the TV controller in the TV image receiver to reduce the brightness on the video signal outputting unit.

In accordance with the first aspect of the invention, the optical disc apparatus is preferably used as a playback apparatus for playing back video and audio data in the optical disc, and when a still image is displayed for many hours on the screen of the display unit in the TV image receiver, the burn-in thereof is prevented, because any image having strong intensity is no longer displayed on the screen of the display unit for a long time.

In a second aspect of the invention, the above objects are attained by a TV system including an optical disc apparatus comprising: a TV image receiver for displaying an image and for outputting sound from a video signal and audio signal of a TV signal; and an optical disc apparatus for recording a recording signal in an optical disc and for playing back data in the optical disc to supply the signal thus played back to the TV image receiver, wherein the TV image receiver comprising: a TV signal selector for selectively accepting either a broadcast signal received by an antenna via a tuner or the playback signal from the optical disc apparatus and for outputting the signal thus selected as a TV signal; a video signal processing unit connected to the TV signal selector for dividing the TV signal into an audio signal and signals relating to the video image; an audio signal outputting unit connected to the video signal processing unit via an audio signal amplifier; a video signal outputting unit connected to the video signal processing unit via a video signal amplifier; and a TV controller for controlling the TV signal selector, the video signal processing unit, the audio signal amplifier and the video signal amplifier, wherein the optical disc apparatus comprising: an optical disc apparatus signal selector for selectively accepting either a broadcast signal received by the antenna via another tuner or a recording signal supplied from an external input terminal to output the signal thus selected as a recording TV signal; a record signal processing unit connected to the optical disc apparatus signal selector for processing the recording TV signal; a record/playback unit for recording the recording TV signal from the record signal processing unit to the optical disc and for reading data in the optical disc to output a playback signal; a playback signal processing unit connected to the record/playback unit for processing the playback signal to output it as a play-backed TV signal; an optical disc apparatus controller for controlling the signal selector, the record signal processing unit, the record/playback unit and the playback signal processing unit; an optical disc apparatus memory allocated to the optical disc apparatus controller for storing still image data; and a signal superimposing unit for superimposing the signal of the still image data on the played-back TV signal to supply a composite TV signal to the TV image receiver, whereby when the time elapsed after a still image is displayed on the video signal outputting unit becomes greater than a predetermined time, the optical disc apparatus controller supplies an instruction of adjusting the brightness to the TV controller in the TV image receiver to reduce the brightness on the video signal outputting unit.

In accordance with the second aspect of the invention, the optical disc apparatus is preferably used as a record/playback apparatus for recording audio and video data in the optical disc and for playing back data therein, that is, it can be used as a usual DVD recorder, and when a still image is displayed for many hours on the screen of the display unit in the TV image receiver, the burn-in thereof is prevented, because any image having strong intensity is no longer displayed on the screen for a long time.

In accordance with the first and second aspects of the invention, the brightness adjusting instruction supplied from the optical disc apparatus controller is used either to reduce the brightness of a still image on the video signal outputting unit, or to reduce the brightness of a still image on the video signal outputting unit, along with the elimination of an OSD image in the still image, or to reduce the brightness of only an OSD image in a still image.

In accordance with the first and second aspects of the invention, using either the optical disc apparatus controller and a timer disposed outside thereof, or the optical disc apparatus controller and a timer element built therein, it is judged that the still image display time elapsed becomes greater than the predetermined time.

In accordance with the first and second aspects of the invention, it is preferable that a TV signal to be selected is further input from an external input terminal to the TV signal selector.

In accordance with the first and second aspects of the invention, it is preferable that the TV image receiver further includes a TV memory connected to the TV controller and a TV image receiver signal superimposing unit for superimposing an image data signal in the TV memory on the video signal supplied from the TV signal selector to supply the signal thus superimposed to the video signal processing unit.

In accordance with the first and second aspects of the invention, either the optical disc apparatus controller and the TV controller are constituted by a common integrated circuit, or the optical disc apparatus memory and the TV memory are constituted by a common memory element.

In accordance with the first and second aspects of the invention, the optical disc is either a DVD or CD.

In accordance with the first and second aspects of the invention, the video signal outputting unit is a CRT or an LC display or a plasma display or an organic light-emitting display.

In accordance with the first and second aspects of the invention, it is preferable that an operation section including a plurality of selection keys for specifying varied functions of the TV system is disposed on a front panel and a remote control section including a plurality of selection keys allocated to the TV system is provided.

In accordance with the first and second aspects of the invention, it is preferable that each of the operation section and the remote control section includes a selection key for providing an instruction of returning the image intensity to the initial intensity when the brightness of the still image is reduced, and a selection key for providing an instruction of recovering the OSD image, when the OSD image is eliminated.

In accordance with the second aspect of the invention, it is preferable that the turner for the optical disc apparatus is commonly used as the TV tuner.

Other objects, features and advantages of the present invention will become apparent from the following description of the preferred embodiments with reference to the accompanying drawings.

DESCRIPTION OF THE PREFERRED EMBODIMENTS

Figure 1:
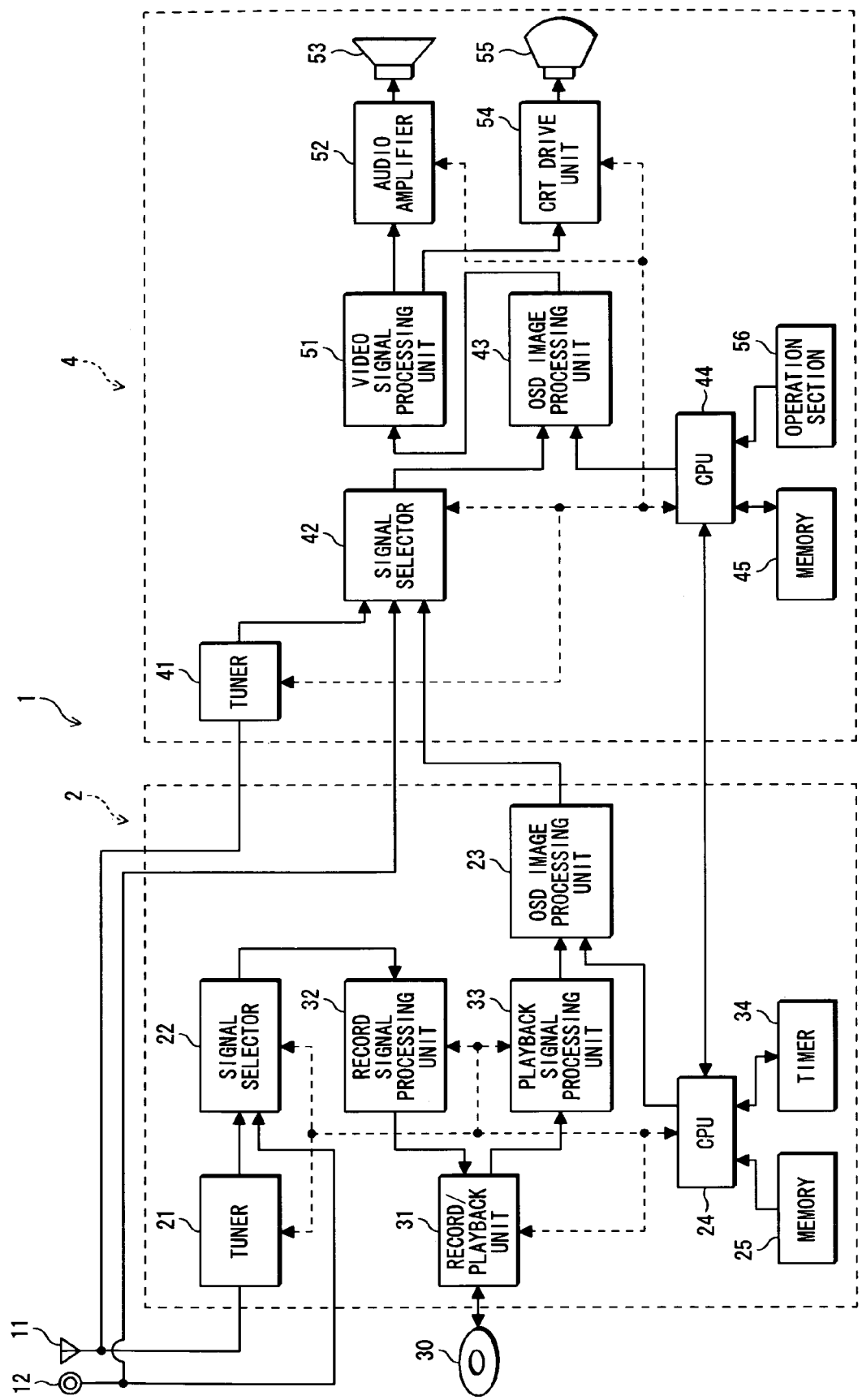
FIG. 1 is a block diagram of a TV system including an optical disc apparatus according to an embodiment of the invention.

Referring now to the block diagram in FIG. 1, a TV system 1 including an optical disc apparatus according to an embodiment of the invention will be described. The TV system 1 includes both the optical disc apparatus used as an optical disc apparatus 2 and a TV image receiver 4, as shown in FIG. 1.

Firstly, the circuit arrangement of the optical disc apparatus 2 will be described. The optical disc apparatus 2 is capable of playing back audio and video data in an optical disc 30 of a recording medium, such as DVD, CD or the like, and further capable of recording the data in a rewritable optical disc 30.

A broadcast signal received by an antenna 11 is tuned in to an appropriate channel in a tuner 21, and then sent to a signal selector 22. In the signal selector 22, either the broadcast signal or a signal from an external input terminal 12 is selected with the aid of a control signal from a CPU 24, and then sent to a record signal processing unit 32. In the record signal processing unit 32, a signal input thereto is A/D-converted, and then encoded, for example, with MPEG-2 method. The signal thus encoded is recorded into the optical disc 30 in a record/playback unit 31.

In the present embodiment, the record/playback unit 31 includes a tray (not shown) for storing the optical disc 30, a record head (not shown) for recording data in the optical disc 30, a playback head (not shown) for playing back data in the optical disc 30 and a rotary driving mechanism (not shown) for rotating the optical disc 30 during recording/playing back. Furthermore, the record/playback unit 31 includes sensors (not shown) for sensing both the existence of the optical disc 30 and the unloaded/loaded state of the tray with the aid of the CPU 24. The data played back in the optical disc 30 by the record/playback unit 31 are decoded in a playback signal processing unit 33, and thereafter supplied to an OSD image processing unit 23 in the TV image receiver 4 after D/A-converted.

Figure 4A:
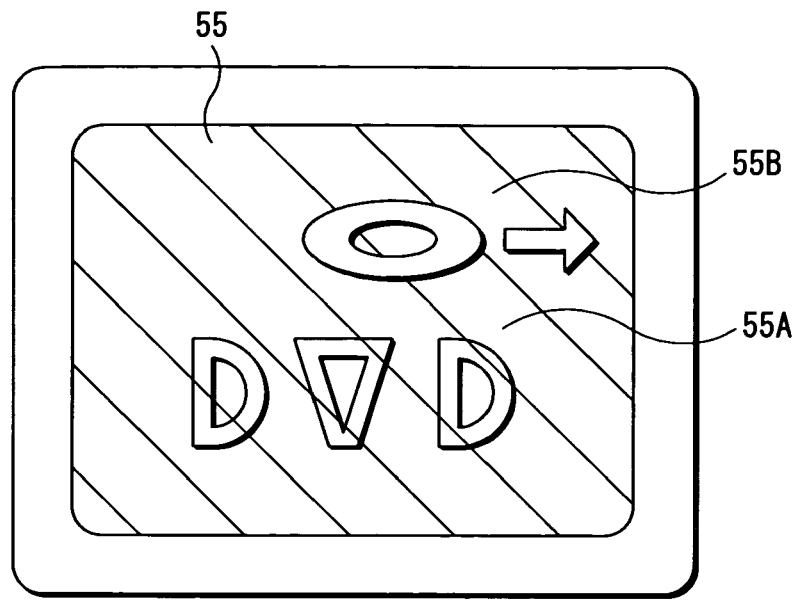
FIG. 4A is an example of a still image comprising a background image and OSD image.

The optical disc apparatus 2 has an OSD function, which enables various messages to be overlapped either on a playback data from the optical disc 30 or on a background image data in order to inform the existence of the optical disc 30 and/or the unloaded/loaded state of the tray to TV viewers. For instance, such an image, as shown in FIG. 4A, is displayed on a CRT 55 in order to inform the empty or unloaded state of the tray. An area hatched by oblique lines (including the mark "DVD") implies a background image 55A, and a portion indicated by thick lines implies an OSD image 55B. Each of these images 55A and 55B is a still image. In this case, the OSD image 55B is displayed in greater intensity than the background image 55A in order to draw TV viewer's attention.

Both the background image data and the OSD image data are stored in a memory 25. The CPU 24 synthesizes these image data after receiving them from the memory 25, and the composite image thus synthesized is supplied to another signal selector 42 in the TV image receiver 4 via the OSD image processing unit 23. When such an image, as shown in FIG. 4A, is displayed on the CRT 55, the still image data, which are supplied from the optical disc apparatus 2 to the TV image receiver 4, includes both data of image having higher intensity and image having lower intensity. In this case, the OSD image 55B is controlled such that it has a greater intensity than the background image 55A. In another case, the OSD image supplied from the memory 25 is superimposed on the playback image in the OSD image processing unit 23, and then supplied to the signal selector 42 in the TV image receiver 4.

The memory 25 and a timer 34 are both connected to the CPU 24. A program for controlling the function of the optical disc apparatus 2, the above-mentioned data of background image and OSD image, data used for recording the broadcast signals into the optical disc 30 (the number of station, the record-starting time, the recording time and others) and data used for controlling various components are stored in the memory 25. In this case, the memory 25 is also used as for a computing work area for the CPU 24. The time data supplied from the CPU 24 is set in the timer 34. After a predetermined time passes, the timer 34 informs to the CPU 24 that the time elapses (time up).

In the following, the circuit arrangement of the TV image receiver 4 will be described. A broadcast signal received by the antenna 11 is tuned in to an appropriate channel by another tuner 41, and then supplied to another signal selector 42. In the signal selector 42, one of the broadcast signal, a signal from the external input terminal 12 and the signal supplied from the OSD image processing unit 23 in the optical disc apparatus 2 is selected with the aid of the control signal from a CPU 44. The output signal from the signal selector 42 is supplied to another OSD image processing unit 43, in which an OSD image signal supplied from the CPU 44 is superimposed on the output signal. In the OSD image processing unit 43, the superimposition of such an OSD image signal for the TV image receiver 4 on the output signal is carried out. The signal thus superimposed is supplied to a video signal processing unit 51, in which the superimposed signal is separated into an audio signal, video signal, horizontal scanning signal and vertical scanning signal. The audio signal is amplified in an audio amplifier 52, and then output therefrom via a speaker 53 as an audio signal outputting unit. The signals relating to the video signal are supplied to a video signal outputting unit, i.e., a CRT 55, via a video signal outputting unit, i.e., a CRT drive unit 54.

An operation section 56 is a remote controller (not shown), which includes a plurality of operation keys disposed on the front panel (not shown) in the TV system 1 including an optical disc apparatus and a number of the other operation keys. The operation keys of a first type are used for operating the optical disc apparatus 2, the operation keys of a second type are used for operating the TV image receiver 4, and the operation keys of a third type are used for operating both the optical disc apparatus 2 and the TV image receiver 4. A signal resulting from the operation of one of these operation keys is supplied to the CPU 44, and a process is carried out in accordance with the type of operation key. Moreover, another memory 45 is connected to the CPU 44, and programs for controlling the function of the TV image receiver 4, OSD image data and various control data are stored in the memory 45. In this case, the memory 45 can also be used as a computing work area for the CPU 44.

The brightness and contrast of an image on the CRT 55 can be adjusted (i.e., either increased or decreased) by utilizing corresponding operation keys in the operation section 56. The memory 45 has a memory area for "the current value of brightness" for storing the current brightness and another memory area for "the brightness saving" which is used to save the data on "the current value of brightness". An operation of a specified operation key causes "the current value of brightness" to be increased or decreased in the memory 45. The value thus altered is supplied to the CRT drive unit 54 by means of the CPU 44, so that the brightness of an image on the CRT 55 can be adjusted (increased or decreased).

Figure 2:
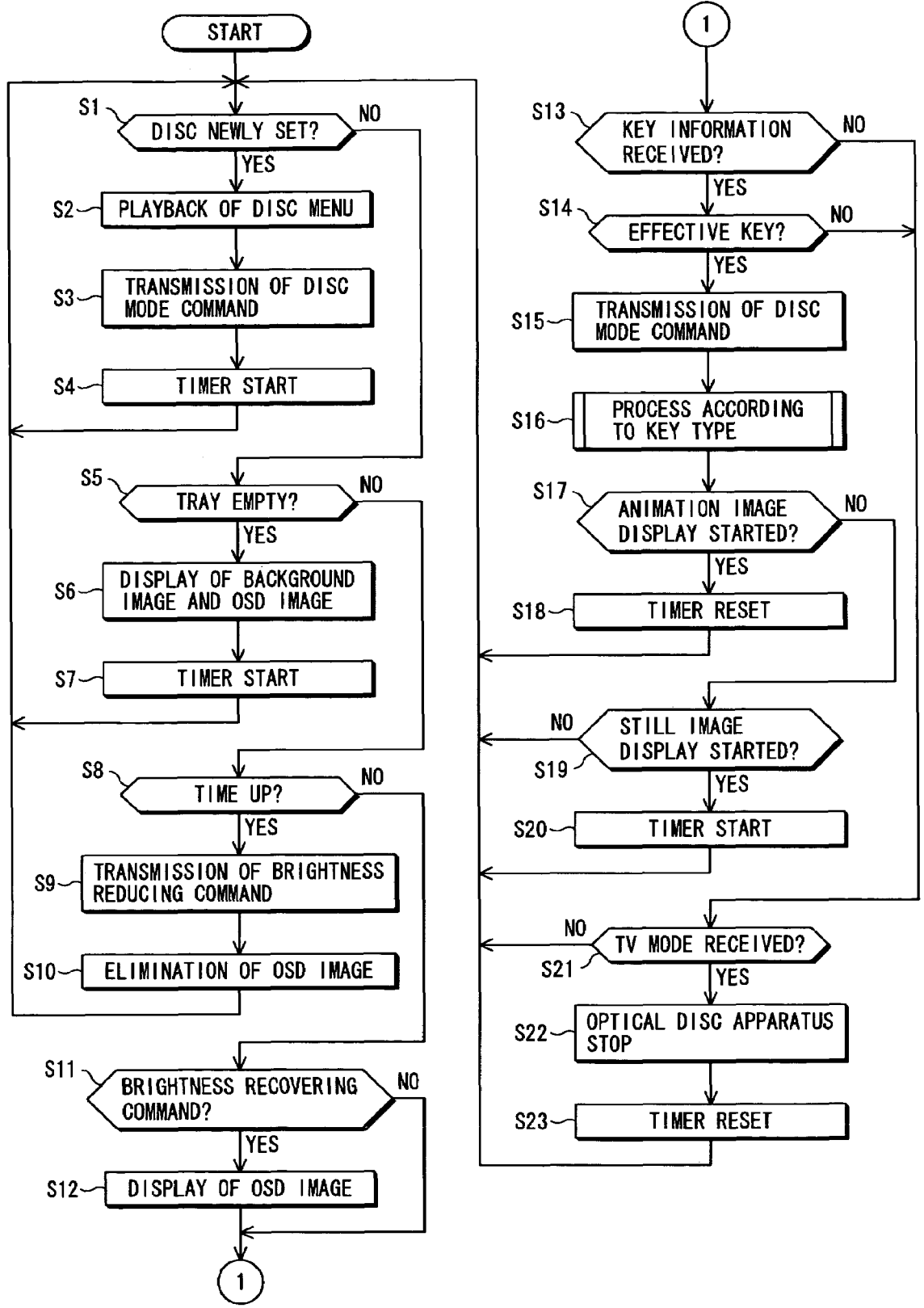
FIG. 2 is a flow chart showing the functions of the optical disc apparatus.
Figure 3:
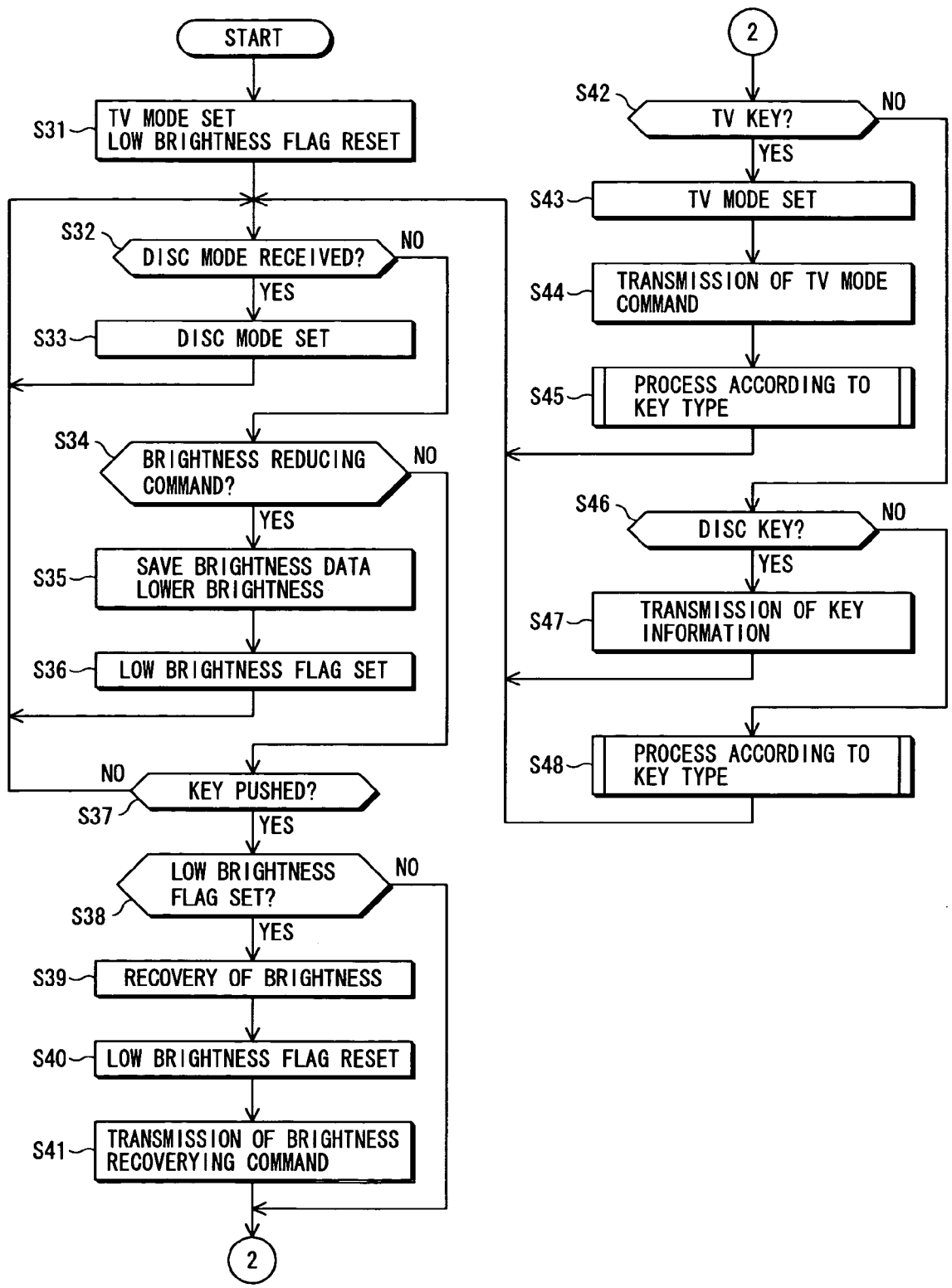
FIG. 3 is a flow chart showing the functions of the TV image receiver.

In the following, the process for preventing the burn-in of the CRT 55 will be described, referring to two flow charts. FIG. 2 is a flow chart for explaining the processes in the optical disc apparatus 2, and FIG. 3 is a flow chart for explaining the processes in the TV image receiver 4. In this case, the optical disc 30 is used as a DVD. In the flow charts, the total function of the TV system 1 including an optical disc apparatus is not described, but substantial portions relating to the invention will be described.

In FIG. 2, the power supply is turned on and a predetermined initialization process is carried out. Thereafter, it is examined as to whether or not an optical disc 30 is in the playback state due to the fact that it is newly placed on a tray (step S1). In the case when the optical disc is newly set and it becomes in the playback state, a disc menu in the DVD is played back (step S2). The disc menu data are supplied to the side of the TV image receiver 4 via the playback signal processing unit 33 and the OSD image processing unit 23. Since the disc menu is a still image, the still image is displayed on the CRT 55 at this moment. Subsequently, the CPU 24 supplies a command of changing the mode into the disc mode to the CPU 44 in the TV image receiver 4 (step S3). The disc mode means a mode at which data (playback data in the optical disc 30, OSD image data and others) in the optical disc apparatus 2 are displayed on the CRT 55.

Subsequently, the timer 34 is set at a predetermined time (for example, five minutes) and then started (step S4). Thereafter, the flow sequence returns to step S1. In accordance with the preset time in the timer 34, the period for which a still image is displayed on the CRT 55 is monitored. When, however, the timer 34 has been already started, the process of starting the timer 34 is not performed, because it follows that the time to be set is again set. Such a process of starting the timer 34 can also be carried out in the other steps, which will be described below.

When the judgment in the step S1 is NO, it is examined as to whether or not the tray for the optical disc 30 is empty (step S5). In the case when the step sequence returns to S1, after the initial judgment in the step S1 is YES and therefore steps S2 to S4 are carried out, the second judgment in the step S1 is NO, because the same optical disc 30 is loaded onto the tray. In the case when the tray is empty, the background image data and OSD image data read out from the memory 25 by means of the CPU 24 are supplied to the OSD image processing unit 23, so that both the background image 55A and OSD image 55B are displayed on the CRT 55, as shown in FIG. 4A (step S6). These images are regarded as a single still image, and therefore it can be recognized that the display of such a still image is started. As a result, the timer 34 for monitoring the display period of the still image is started (step S7).

In the case when it is judged in the step S5 that the tray is not empty, it is examined in the timer 34 as to whether or not the time is up (step S8). The fact that the time is up in the timer 34 means that the still image is continuously displayed past the preset time in the timer 34. In the case when the time is up, the CPU 24 in the optical disc apparatus 2 transmits a command of reducing the brightness (the command includes a message for informing the period for which the still image data is displayed past the preset time, and the command can be regarded as a command for instructing the reduction in the brightness of an image on the CRT 55) to the CPU 44 in the TV image receiver 4 (step S9), and the OSD image 55B in the still image is eliminated (step S10), thereafter returning to step S1.

Figure 4B:
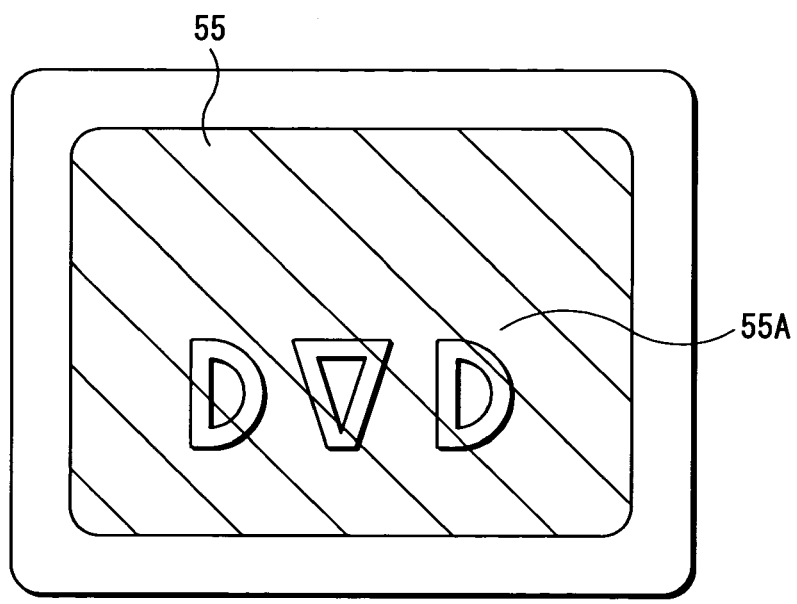
FIG. 4B is an example of a still image including only a background image.

When the OSD image 55B is eliminated, it follows that only the background image 55A is displayed on the CRT 55, as shown in FIG. 4B. Since the OSD image 55B has greater intensity than the background image 55A, the elimination of the OSD image 55B provides more efficient measures to suppress the burn-in of the CRT 55. The elimination is realized by the CPU 24, which prohibits to read out the OSD image data from the memory 25 and further supplies only the background image data to the OSD image processing unit 23. In the above embodiment, the OSD image 55B is eliminated just after the command of reducing the brightness is transmitted to the CPU 44. In another embodiment, however, it is possible that the CPU 44 in the TV image receiver 4 reduces the brightness of the image on the CRT 55, and the OSD image 55B is eliminated after receiving the command of process completion from the CPU 44.

In the case when the time is not up in the step S8, it is examined as to whether or not a command of recovering the brightness is received from the CPU 44 in the TV image receiver 4 (step S11). When the command is received, the OSD image 55B, which is eliminated in the step S10, is displayed (step S12). As a result, the content of the image displayed on the CRT 55 becomes the image content in the initial state before the OSD image 55B is eliminated in the step S10. After the step S12 is executed and when the command of recovering the brightness in the step S11 is not received, it is examined as to whether or not the information about the key for operating the optical disc apparatus 2 is received from the TV image receiver 4 (step S13). In the case when the information of key is received, it is examined as to whether or not the key included in the information is effective (step S14). Whether or not the key can be used depends on the state of the optical disc apparatus 2, and consequently the unusable key is excluded in the step S14.

In the case when it is judged that the key is effective, the CPU 24 transmits a command of changing the mode to the disc mode to the CPU 44 in the TV image receiver 4 (step S15). Subsequently, a corresponding process is carried out in response to the type of the received key (step S16). When, for instance, "a playback key" is received under a condition that the optical disc 30 is loaded, the playback of the optical disc 30 starts. When "a menu key" is pushed to carry out the set operation, the OSD image for menu display is supplied from the optical disc apparatus 2 to the TV image receiver 4, and displayed on the CRT 55.

Subsequently, it is examined as to whether or not the display of an animation image starts due to the process in the step S16 (step S17). In the case when the display of the animation image starts, the timer 34 is reset, since it is unnecessary to monitor the time of displaying the still image (step S18), and thereafter returning to the step S1. The animation image is displayed at the moment that the "playback key" is received and the playback of the optical disc 30 starts. In this case, the animation image data is supplied to the TV image receiver 4, and then displayed on the CRT 55.

In the case when it is judged that the display of the animation image is not displayed in the step S17, it is examined as to whether or not the display of a still image starts (step S19). When the display of the still image is displayed, the timer 34 is started (step S20), thereafter returning to the step S1. In this case, the timer 34 monitors the display period of the still image. In the case when it is judged that the display of a still image does not start, a process independent of displaying is carried out in the step S16, so that nothing else is carried out, thereafter returning to the step S1.

In the case when it is judged in the step S13 that the information on the key is not received and in the case when it is judged in the step S14 that the key is not effective, it is examined as to whether a command of changing the mode into the TV mode is received (step S21). This command is transferred from the CPU 44 in the TV image receiver 4 to the CPU 24 in the optical disc apparatus 2, when the mode is set into the TV mode on the side of the TV image receiver 4. The TV mode can be regarded as a mode at which a broadcast signal is displayed on the CRT 55. For instance, the mode changes from the disc mode to the TV mode, when a TV viewer, who watches data played back from the optical disc 30, pushes a tuning key in the operation section 56 in order to see a broadcast program. When the command is received, the CPU 24 stops the operation of the optical disc apparatus 2 (step S22), and then resets the timer 34 (step S23), thereafter returning to the step S1. This is due to the fact that it is unnecessary to monitor the display period of the still image because the broadcast program for an animation image is displayed on the CRT 55.

In the following, the function of the TV image receiver 4 will be described, referring to FIG. 3. Firstly, the power supply is turned on, and a predetermined initialization is carried out. Thereafter, the mode is set into the TV mode and the low brightness flag is reset (step S31). Both the data and low brightness flag in this mode are stored in the memory 45. Subsequently, it is examined as to whether or not the command of changing the mode into the disc mode is received from the CPU 24 in the optical disc apparatus 2 (step S32). When the command is received, the mode is set into the disc mode (step S33). In this case, a selection signal for selecting one of the signals from the optical disc apparatus 2 is supplied from the CPU 44 to the signal selector 42, and the data (the playback data of the optical disc 30, OSD image data and others), which are supplied from the optical disc apparatus 2, are displayed on the CRT 55, thereafter returning to the step S32.

In the case when it is judged that the disc mode command is received, it is examined as to whether or not the command of reducing the brightness is received (step S34). When the command is received, data on "the current value of brightness" in the memory 45 is saved in an area of "the brightness saving", together with reducing "the current value of brightness", and the value thus reduced is supplied to the CRT drive unit 54 in order to reduce the brightness of the image on the CRT 55 (step S35). In this case, the brightness on the CRT 55 is reduced to a 25% value or so with reference to the current value, thereby enabling the burn-in to be suppressed on the screen of the CRT 55. Subsequently, a low brightness flag is set (step S36), thereafter returning to the step S32. The low brightness flag indicates a reduced brightness on the CRT 55 for preventing the burn-in.

In the case when it is judged that the command of reducing the brightness is not received, it is examined as to whether or not a key is pushed in the operation section 56 (step S37), whereby returning to the step S32, when the key is not pushed. In the case when the key is pushed, it is examined as to whether or not the low brightness flag is set (step S38). The flow goes to the step S42, when the flag is not set. In the case when the flag is set, the content of "the brightness saving" is changed into "the current value of brightness". The brightness on the CRT 55 is recovered (or returned) to the initial brightness by supplying the changed value to the CRT drive unit 54 (step S39). Subsequently, the low brightness flag is reset (step S40), and then the command of recovering the brightness is supplied to the CPU 24 in the optical disc apparatus 2 (step S41), and thereafter transferring to step S42.

Then, it is examined as to whether or not the key for the TV image receiver 4 is pushed (step S42). The judgment is carried out, based on the code of the pushed key in the operation section 56 and the mode in the current state. When the key for the TV image receiver 4 is pushed, the mode is set in the TV mode (step S43). In accordance with the setting, a signal for selecting the broadcast signal is supplied from the CPU 44 to the signal selector 42, thereby allowing the broadcast program to be displayed on the CRT 55. Subsequently, the TV mode command is transmitted in order to inform that the TV mode is set on the side of the optical disc apparatus 2 (step S44), and then a process in accordance with the type of key, for example, the change of the channel number in the broadcast program is carried out (step S45), thereafter returning to the step S32.

In the case when it is not judged that the key for TV image receiver 4 is pushed, it is examined as to whether or not the key for the optical disc apparatus 2 is pushed (step S46). When the key for the optical disc apparatus 2 is pushed, the information on the key is transmitted to the CPU 24 in the optical disc apparatus 2 (step S47), thereafter returning to the step S32. In the case when it is not judged that the key for the optical disc apparatus 2 is pushed, it follows that a key common for both the optical disc apparatus 2 and the TV image receiver 4 (for example, a key of adjusting the sound volume) is pushed, and therefore the process in accordance with the type of key is carried out (step S48), thereafter returning to the step S32.

In the above-described procedure for preventing the burn-in in the screen of the CRT 55, the brightness on the CRT 55 is reduced to suppress the burn-in, when a still image is continuously displayed on the CRT 55 for a predetermined period. Moreover, the adjustment of the brightness is not carried out, using the brightness information in a signal supplied from the optical disc apparatus 2 to the TV image receiver 4, but the brightness is reduced with reference to the brightness on the CRT 55 prior to the brightness reduction (the brightness, which is pre-adjusted in an appropriate value to view a video or a broadcast program in the optical disc 30). Accordingly, the brightness thus reduced ensures not to be too bright on the screen of the CRT 55, therefore enabling the burn-in to be suppressed. Moreover, it is not too dark, hence making it possible for a viewer to clearly identify the content of the displayed still image. In addition, a high contrast portion relative to the other portions in a still image, for example, the OSD image 55B in FIG. 4A is eliminated from the still image, thereby enabling the burn-in to be more efficiently suppressed.

In the above embodiment, the TV system 1 including an optical disc apparatus is described, wherein audio and video data can be recorded and played back in a recording medium of such an optical disc 30 as DVD, CD or the like. However, the present invention is also applicable to the TV system in which a recording medium other than the optical disc, such as videotape, can also be used.

In the above embodiment, the CPU 24 and memory 25 are disposed on the side of the optical disc apparatus 2, and the CPU 44 and memory 45 are disposed on the side of the TV image receiver 4. However, the present invention can be realized by a single CPU and single memory into each of which the CPU's and the memories are respectively combined.

In the above embodiment, moreover, it is described that the CRT 55 is used as a video signal outputting unit. The present invention is applicable either to a TV system including an optical disc apparatus or to a TV system including a playback apparatus, so long as the burn-in takes place on the video signal outputting unit like a CRT due to a long time display of a still image.

In the above embodiment, moreover, it is described that the brightness on the CRT 55 is reduced, along with the elimination of the OSD image 55B in the still image. However, a desirable effect to suppress the burn-in of the CRT 55 can also be obtained without eliminating the OSD image 55B. Furthermore, a similar effect to suppress the burn-in of the CRT 55 can be obtained not by reducing the brightness of the entire still image, but by reducing the brightness at only the OSD image 55B. In this case, the brightness on the CRT 55 can be reduced by using the information about the brightness in the OSD image data, which are supplied from the optical disc apparatus 2.

In the above embodiment, moreover, it is described that the display period of the still image is monitored, using the timer 34. However, the display period of the still image can be monitored by comparing the current time with the time at which the display of the still image is started. In this case, the time 34 is included in the control section because it controls the active elements of the TV image receiver 4 together with the CPU 24.

While the present invention has been described with reference to the preferred embodiments, it is to be understood that the invention is not limited thereto. On the contrary, the invention is intended to cover various modifications and equivalent arrangements included within the spirit and scope of the appended claims.

What is claimed is:

1. A TV system including an optical disc apparatus comprising:
   a TV image receiver for displaying an image and for outputting sound from a video signal and audio signal of a TV signal; and
   an optical disc apparatus for playing back data in an optical disc and for supplying the signal thus played back to said TV image receiver,
   wherein said TV image receiver comprising:
   a TV signal selector for selectively accepting either a broadcast signal received by an antenna via a tuner or said playback signal from said optical disc apparatus and
for outputting the signal thus selected as a TV signal;
a video signal processing unit connected to said TV signal
selector for dividing said TV signal into an audio signal
and signals relating to the video image;
an audio signal outputting unit connected to said video
signal processing unit via an audio signal amplifier;
a video signal outputting unit connected to said video signal processing unit via a video signal amplifier; and
a TV controller for controlling said TV signal selector, said
video signal processing unit, said audio signal amplifier
and said video signal amplifier,
wherein said optical disc apparatus comprising:
a playback unit for reading data in said optical disc to
output a playback signal;
a playback signal processing unit connected to said playback unit for processing said playback signal to output it
as a play-backed TV signal;
an optical disc apparatus controller for controlling said
playback unit and said playback signal processing unit;
an optical disc apparatus memory allocated to said optical
disc apparatus controller for storing still image data; and
a signal superimposing unit for superimposing said signal
of said still image data on said played-back TV signal to
supply a composite TV signal to said TV image receiver,
whereby when the time elapsed after a still image is displayed on said video signal outputting unit becomes
greater than a predetermined time, said optical disc
apparatus controller supplies an instruction of adjusting
the brightness to said TV controller in said TV image
receiver to reduce the brightness on the video signal
outputting unit.

2. A TV system including an optical disc apparatus according to claim 1, wherein the brightness adjusting instruction supplied from said optical disc apparatus controller is used to reduce the brightness of a still image on said video signal outputting unit.

3. A TV system including an optical disc apparatus according to claim 1, wherein the brightness adjusting instruction supplied from said optical disc apparatus controller is used to reduce the brightness of a still image on said video signal outputting unit, along with the elimination of an OSD image in said still image.

4. A TV system including an optical disc apparatus according to claim 1, wherein the brightness adjusting instruction supplied from said optical disc apparatus controller is used to reduce the brightness of only an OSD image in a still image.

5. A TV system including an optical disc apparatus according to claim 1, wherein using said optical disc apparatus controller and a timer disposed outside thereof, it is judged that the still image display time elapsed becomes greater than said predetermined time.

6. A TV system including an optical disc apparatus according to claim 1, wherein using said optical disc apparatus controller and a timer element built therein, it is judged that the still image display time elapsed becomes greater than said predetermined time.

7. A TV system including an optical disc apparatus according to claim 1, wherein a TV signal to be selected is further input from an external input terminal to said TV signal selector.

8. A TV system including an optical disc apparatus according to claim 1, wherein said TV image receiver further includes a TV memory connected to said TV controller and a TV image receiver signal superimposing unit for superimposing an image data signal in said TV memory on the video signal supplied from said TV signal selector to supply the signal thus superimposed to said video signal processing unit.

9. A TV system including an optical disc apparatus according to claim 8, wherein said optical disc apparatus controller and said TV controller are constituted by a common integrated circuit and wherein said optical disc apparatus memory and said TV memory are constituted by a common memory element.

10. A TV system including an optical disc apparatus according to claim 1, wherein said optical disc is a DVD.

11. A TV system including an optical disc apparatus according to claim 1, wherein said optical disc is a CD.

12. A TV system including an optical disc apparatus according to claim 1, wherein said video signal outputting unit is a CRT.

13. A TV system including an optical disc apparatus according to claim 1, wherein said video signal outputting unit is an LC display.

14. A TV system including an optical disc apparatus according to claim 1, wherein said video signal outputting unit is a plasma display.

15. A TV system including an optical disc apparatus according to claim 1, wherein said video signal outputting unit is an organic light-emitting display.

16. A TV system including an optical disc apparatus according to claim 1, wherein an operation section including a plurality of selection keys for specifying varied functions of the TV system is disposed on a front panel and wherein a remote control section including a plurality of selection keys allocated to the TV system is provided.

17. A TV system including an optical disc apparatus according to claim 16, wherein each of said operation section and said remote control section includes a selection key for providing an instruction of returning the image intensity to the initial intensity when the brightness of the still image is reduced, and a selection key for providing an instruction of recovering the OSD image, when the OSD image is eliminated.

18. A TV system including an optical disc apparatus comprising:
a TV image receiver for displaying an image and for outputting sound from a video signal and audio signal of a TV signal; and
an optical disc apparatus for recording a recording signal in an optical disc and for playing back data in said optical disc to supply the signal thus played back to said TV image receiver,
wherein said TV image receiver comprising:
a TV signal selector for selectively accepting either a broadcast signal received by an antenna via a tuner or said playback signal from said optical disc apparatus and for outputting the signal thus selected as a TV signal;
a video signal processing unit connected to said TV signal selector for dividing said TV signal into an audio signal and signals relating to the video image;
an audio signal outputting unit connected to said video signal processing unit via an audio signal amplifier;
a video signal outputting unit connected to said video signal processing unit via a video signal amplifier; and
a TV controller for controlling said TV signal selector, said video signal processing unit, said audio signal amplifier and said video signal amplifier,
wherein said optical disc apparatus comprising:
an optical disc apparatus signal selector for selectively accepting either a broadcast signal received by said antenna via another tuner or a recording signal supplied from an external input terminal to output the signal thus selected as a recording TV signal;

a record signal processing unit connected to said optical disc apparatus signal selector for processing said recording TV signal;

a record/playback unit for recording said recording TV signal from said record signal processing unit to said optical disc and for reading data in said optical disc to output a playback signal;

a playback signal processing unit connected to said record/playback unit for processing said playback signal to output it as a play-backed TV signal;

an optical disc apparatus controller for controlling said signal selector, said record signal processing unit, said record/playback unit and said playback signal processing unit;

an optical disc apparatus memory allocated to said optical disc apparatus controller for storing still image data; and a signal superimposing unit for superimposing said signal of said still image data on said played-back TV signal to supply a composite TV signal to said TV image receiver, whereby when the time elapsed after a still image is displayed on said video signal outputting unit becomes greater than a predetermined time, said optical disc apparatus controller supplies an instruction of adjusting the brightness to said TV controller in said TV image receiver to reduce the brightness on the video signal outputting unit.

19. A TV system including an optical disc apparatus according to claim 18, wherein the brightness adjusting instruction supplied from said optical disc apparatus controller is used to reduce the brightness of a still image on said video signal outputting unit.

20. A TV system including an optical disc apparatus according to claim 18, wherein the brightness adjusting instruction supplied from said optical disc apparatus controller is used to reduce the brightness of a still image on said video signal outputting unit, along with the elimination of an OSD image in said still image.

21. A TV system including an optical disc apparatus according to claim 18, wherein the brightness adjusting instruction supplied from said optical disc apparatus controller is used to reduce the brightness of only an OSD image in a still image.

22. A TV system including an optical disc apparatus according to claim 18, wherein using said optical disc apparatus controller and a timer disposed outside thereof, it is judged that the still image display time elapsed becomes greater than said predetermined time.

23. A TV system including an optical disc apparatus according to claim 18, wherein using said optical disc apparatus controller and a timer element built therein, it is judged that the still image display time elapsed becomes greater than said predetermined time.

24. A TV system including an optical disc apparatus according to claim 18, wherein a TV signal to be selected is further input from an external input terminal to said TV signal selector.

25. A TV system including an optical disc apparatus according to claim 18, wherein said TV image receiver further includes a TV memory connected to said TV controller and a TV image receiver signal superimposing unit for superimposing an image data signal in said TV memory on the video signal supplied from said TV signal selector to supply the signal thus superimposed to said video signal processing unit.

26. A TV system including an optical disc apparatus according to claim 25, wherein said optical disc apparatus controller and said TV controller are constituted by a common integrated circuit and wherein said optical disc apparatus memory and said TV memory are constituted by a common memory element.

27. A TV system including an optical disc apparatus according to claim 25, wherein said turner for said optical disc apparatus is commonly used as said TV tuner.

28. A TV system including an optical disc apparatus according to claim 18, wherein said optical disc is a DVD.

29. A TV system including an optical disc apparatus according to claim 18, wherein said optical disc is a CD.

30. A TV system including an optical disc apparatus according to claim 18, wherein said video signal outputting unit is a CRT.

31. A TV system including an optical disc apparatus according to claim 18, wherein said video signal outputting unit is an LC display.

32. A TV system including an optical disc apparatus according to claim 18, wherein said video signal outputting unit is a plasma display.

33. A TV system including an optical disc apparatus according to claim 18, wherein said video signal outputting unit is an organic light-emitting display.

34. A TV system including an optical disc apparatus according to claim 18, wherein an operation section including a plurality of selection keys for specifying varied functions of the TV system is disposed on a front panel and wherein a remote control section including a plurality of selection keys allocated to the TV system is provided.

35. A TV system including an optical disc apparatus according to claim 34, wherein each of said operation section and said remote control section includes a selection key for providing an instruction of returning the image intensity to the initial intensity when the brightness of the still image is reduced, and a selection key for providing an instruction of recovering the OSD image, when the OSD image is eliminated.

* * * * *